United States Patent

[11] 3,548,870

[72] Inventors Lester C. Morton
Dunmurray, Northern Ireland
Frank J. Voos, Stratford, Conn.
[21] Appl. No. 694,170
[22] Filed Dec. 28, 1967
[45] Patented Dec. 22, 1970
[73] Assignee National Distillers and Chemical Corporation
New York, N.Y.
a corporation of Virginia

[54] PRESSURE RELIEF VALVE
5 Claims, 4 Drawing Figs.
[52] U.S. Cl. .................................................. 137/540, 251/333
[51] Int. Cl. ................................................... F16k 17/04
[50] Field of Search ........................................ 137/516.29, 540, 543.17, 234.5AC; 251/333, 356, 357

[56] References Cited
UNITED STATES PATENTS

| | | | |
|---|---|---|---|
| 3,071,153 | 1/1963 | Cornelius .................. | 137/516.29 |
| 3,228,419 | 1/1966 | Smith et al. ................ | 137/540 |
| 3,430,647 | 3/1969 | Suchowolec ............... | 137/543.17X |
| 1,438,081 | 12/1922 | Allen .......................... | 137/234.5 |
| 1,563,320 | 12/1925 | Beck ........................... | 137/234.5 |
| 1,287,838 | 12/1918 | Benzion ...................... | 137/543.17X |
| 618,878 | 2/1899 | Hills ........................... | 251/356X |
| 2,976,010 | 3/1961 | Huthsing .................... | 251/333 |

FOREIGN PATENTS

| | | | |
|---|---|---|---|
| 728,781 | 4/1955 | Great Britain ............ | 137/540 |
| 312,969 | 11/1933 | Italy .......................... | 137/540 |

*Primary Examiner*—William F. O'Dea
*Assistant Examiner*—David J. Zobkiw
*Attorney*—Allen A. Meyer Jr.

ABSTRACT: A pressure relief valve formed of a tubular stem has a reentrantly bent end forming an annular valve seat. A molded, pliable insert formed in a metal cup is biased into engagement with the annular seat by a spring captured in the tubular stem with a predetermined force.

3,548,870

INVENTORS
LESTER C. MORTON
FRANK J. VOOS
BY Allen A. Meyer, Jr.
ATTORNEY

PRESSURE RELIEF VALVE

This invention is an improvement of the pressure relief valve shown in U.S. Pat. No. 3,228,419, in the name of Smith et al. entitled "Relief Valve," and assigned to the assignee of the present invention.

This invention relates to valves, and more particularly relates to an improved pressure relief valve having improved accuracy and consistency of opening at a given pressure. In accordance with the invention, it has been found that manufacturing expense can be reduced and pressure relief accuracy improved in a relief valve of the type shown in U.S. Pat. No. 3,228,419 by forming the valve plunger as a cup containing a resilient material therein which engages an annular valve seat formed by a reentrantly bend end portion of the valve stem or casing.

Accordingly, a primary object of this invention is to form a pressure relief valve having improved pressure relief accuracy.

Another object of this invention is to reduce the manufacturing expense of a pressure relief valve.

These and other objects of this invention will become apparent from the following description when taken in connection with the drawings in which.

Figure 1:
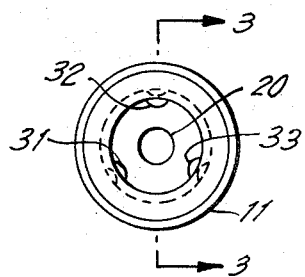
FIG. 1 is a top view of the valve of the present invention.

Referring now to the drawings, there is provided a valve stem or casing 10 formed of aluminum, and having a thickness of 0.015 inches, a length of 0.730 inches, and an inner diameter of 0.168 inches. Clearly, other dimensions could be used, depending on the desired application of the device. The left-hand end of casing 10 is provided with a mounting flange 11 which could be mounted in an opening in a wall, such as wall 12 of a vessel which is to be filled with gas under pressure, or which will somehow have a pressure differential thereacross, with the pressure to the right of wall 12 in FIG. 3 being higher than the pressure to the left of wall 12.

The right-hand end of casing 10 has a reduced diameter portion 13 which a has an inner diameter of 0.160 inches. The right-hand end is then bent inwardly, shown as reentrant portion 14, which has an annular seat 15 having an inner diameter of 0.70 inches. Seat 15 is faced or burnished flat and is free of burrs.

Figure 4:
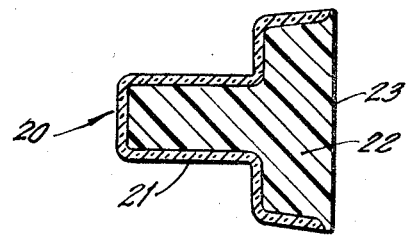
FIG. 4 is an enlarged cross-sectional view of the cup of FIG. 3.

A valve cup 20 (FIG. 4) is then formed as shown in FIG. 4 of a brass cup 21 which has a natural rubber body 22 molded therein, and has a flat, smooth surface 23 extending slightly beyond the right-hand end of cup 21. Good results have been obtained when using a natural rubber (white) molded in the cup for 10 minutes at 315° F. Thereafter, the molded cup is tumbled at −90° F. to remove rubber flash from the exterior of cup 21. Cup 21 has a thickness of 0.008 inches; its small diameter section has an inner diameter of 0.047 inches, and the larger diameter section tapers outward from 0.144-inches outer diameter to 0.151-inches outer diameter at its extreme right-hand end. Obviously, other dimensions could be used, depending on the application of the device.

Figure 3:
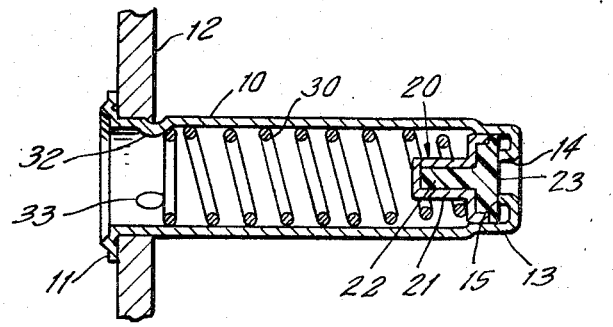
FIG. 3 is a cross-sectional view of FIG. 1 taken across section line 3-3 in FIG. 1.
Figure 2:
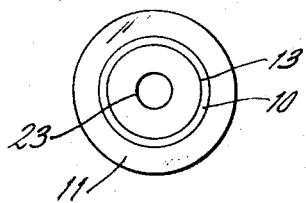
FIG. 2 is a bottom view of the valve of the invention.

Surface 23 of valve cup 20 is then pressed into engagement with annular seat 16 by spring 30. The right-hand end of spring 30 bears on valve cup 20, as shown in FIG. 3, and its left-hand end is captured by indentations 31, 32 and 33 (FIGS. 1 and 3) in casing 10.

In operation, when the pressure to the right of wall 12 exceeds the pressure to the left by a given amount, dependent on the compression of spring 30, surface 23 of valve cup 20 will be pressed away from seat 15, thereby venting pressure through the center of casing 10 to the left of wall 12 until the pressure to the right of wall 12 has decreased sufficiently to permit surface 23 to reseat on seat 15.

It has been found that the configuration of FIGS. 1 to 4 achieves more consistent pressure relief operation at a given pressure setting and that the device is more easily manufactured, as compared to the arrangement shown in the above-mentioned U.S. Pat. No. 3,228,419.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

We claim:

1. A pressure relief valve comprising a hollow cylindrical casing terminating at one extremity in a portion of reduced diameter; a valve cup and a biasing spring; the end of said casing of reduced diameter being reentrantly bent inwardly of said casing and forming a flat, annular valve seat lying in a plane perpendicular to the axis of said casing; said valve cup comprising a metallic cup-shaped sheath filled with a solid pliable material; one end of said sheath being open and of greater diameter than said valve seat and the opposed closed end of said sheath; said pliable material extending beyond the open end of said sheath and having a flat exposed surface of greater diameter than the remainder of said pliable material extending completely across said open end of said sheath and lying in a plane parallel to the plane of said annular valve seat; the portion of said sheath of greater diameter being receivable within the portion of said cylindrical casing of reduced diameter; said flat exposed surface of said valve cup facing and adjacent to said valve seat to seal across said valve seat; said biasing spring comprising a spiral compression spring having one end connected to said valve cup and its other end connected to the other end of said casing, and biasing said flat surface of said valve cup into engagement with said valve seat.

2. The device as set forth in claim 1 wherein said other end of said casing has a plurality of indentations therein lying in a plane perpendicular to the axis of said casing; said other end of said spring captured by said plurality of indentations.

3. The device as set forth in claim 2 wherein said valve cup has a small diameter portion and a large diameter portion and a shoulder between said small and large diameter portions; said one end of said spring seating around said small diameter portion and against said shoulder formed between said small and large diameter portions.

4. The device of claim 3 wherein said large diameter portion of said cup tapers outwardly from said shoulder.

5. The device as set forth in claim 1 wherein said valve cup has a small diameter portion and a large diameter portion and a shoulder between said small and large diameter portions; said one end of said spring seating around said small diameter portion and against said shoulder formed between said small and large diameter portions.